United States Patent
Meinders et al.

(10) Patent No.: US 7,368,223 B2
(45) Date of Patent: May 6, 2008

(54) MULTI-STACK OPTICAL DATA STORAGE MEDIUM AND USE OF SUCH A MEDIUM

(75) Inventors: Erwin Rinaldo Meinders, Eindhoven (NL); Hermanus Johannes Borg, Eindhoven (NL); Guo-Fu Zhou, Eindhoven (NL); Johannes Cornelis Norbertus Rijpers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 364 days.

(21) Appl. No.: 10/479,202
(22) PCT Filed: May 27, 2002
(86) PCT No.: PCT/IB02/01872
§ 371 (c)(1),
(2), (4) Date: Nov. 26, 2003
(87) PCT Pub. No.: WO02/099796
PCT Pub. Date: Dec. 12, 2002

(65) Prior Publication Data
US 2004/0146683 A1    Jul. 29, 2004

(30) Foreign Application Priority Data
Jun. 1, 2001    (EP) .................................. 01202089

(51) Int. Cl.
*G11B 7/24* (2006.01)
(52) U.S. Cl. ................ 430/270.13; 430/945; 428/64.4; 428/64.6; 369/275.2; 369/275.5
(58) Field of Classification Search ............... 428/64.1, 428/64.4, 65.5, 64.6, 913; 430/270.13, 945, 430/495.1
See application file for complete search history.

(56) References Cited

U.S. PATENT DOCUMENTS 5,124,232 A * 6/1992 Nakanishi et al. ..... 430/270.13
(Continued)

FOREIGN PATENT DOCUMENTS
EP        0 810 590    * 12/1997
(Continued)

OTHER PUBLICATIONS

Translation of JP 61-208648.*
(Continued)

*Primary Examiner*—Martin Angebranndt
(74) *Attorney, Agent, or Firm*—Michael E. Belk

(57) ABSTRACT

A multi-stack optical data storage medium for rewritable recording by a focused laser-light beam, the medium having a substrate with deposited on aside thereof:
- a first recording stack comprising a phase-change type recording layer
- at least one further recording stack comprising a phase-change type recording layer,
- a transparent spacer layer adjacent each further recording stack. The further recording stack is sufficiently transmissive to ensure proper sensitivity for reading and recording in the first recording stack. For this purpose, at least one indium tin oxide layer is present in at least one of the further recording stacks. The indium tin oxide layer further ensures proper cooling behavior of the recording layer of the further recording stack in order to obtain sufficient recording performance in the farther recording stack.

17 Claims, 4 Drawing Sheets

U.S. PATENT DOCUMENTS

| | | | |
|---|---|---|---|
| 5,308,706 A * | 5/1994 | Kawaguchi et al. | 428/426 |
| 5,656,832 A * | 8/1997 | Ohba et al. | 257/190 |
| 5,761,188 A * | 6/1998 | Rosen et al. | 369/275.2 |
| 5,907,534 A * | 5/1999 | Yamatsu | 369/286 |
| 6,190,750 B1 | 2/2001 | Wierenga et al. | 428/64.1 |
| 6,434,095 B1 * | 8/2002 | Nishiuchi et al. | 369/44.27 |
| 6,861,117 B2 * | 3/2005 | Rijpers et al. | 428/64.1 |
| 2003/0037437 A1 * | 2/2003 | Das et al. | 29/889.1 |
| 2003/0147341 A1 * | 8/2003 | Fargeix et al. | 369/284 |
| 2004/0146683 A1 * | 7/2004 | Meinders et al. | 428/64.1 |

FOREIGN PATENT DOCUMENTS

| | | | |
|---|---|---|---|
| EP | 1 001 415 | * | 11/1999 |
| JP | 61-148645 | * | 7/1986 |
| JP | 61-208648 | * | 9/1986 |
| JP | 62-204442 | * | 9/1987 |
| JP | 02-103189 | * | 4/1990 |
| JP | 02-206587 | * | 8/1990 |
| JP | 4-34742 | * | 2/1992 |
| JP | 5-144107 | * | 6/1993 |

OTHER PUBLICATIONS

Translation of JP 04-034742.*

* cited by examiner

MULTI-STACK OPTICAL DATA STORAGE MEDIUM AND USE OF SUCH A MEDIUM

The invention relates to a multi-stack optical data storage medium for rewritable recording by means of a focused laser-light beam, said medium having a substrate with deposited on a side thereof:
- a first recording stack comprising a phase-change type recording layer, said first recording stack being present most remote for the focused laser-light beam,
- at least one flier recording stack comprising a phase-change type recording layer,
- a transparent spacer layer adjacent each further recording stack at a side closest to the first recording stack, said transparent layer having a thickness larger than the depth of focus of the focused laser-light beam.

The invention also relates to the use of such a multi-stack optical data storage medium for high data rate recording applications.

An embodiment of an optical data storage medium of the type mentioned in the opening paragraph is known from U.S. Pat. No. 6,190,750, filed by Applicants.

An optical data storage medium based on the phase-change principle is attractive, because it combines the possibilities of direct overwrite (DOW) and high storage density with easy compatibility with read-only optical data storage systems. Data storage, in this context, includes digital video-, digital audio- and software-data storage. Phase-change optical recording involves the formation of submicrometer-sized amorphous recording marks in a crystalline recording layer using a focused relatively high power laser-light beam. During recording of information, the medium is moved with respect to the focused laser-light beam that is modulated in accordance with the information to be recorded. Marks are formed when the high power laser-light beam melts the crystalline recording layer. When the laser-light beam is switched off and/or subsequently moved relatively to the recording layer, quenching of the molten marks takes place in the recording layer, leaving an amorphous information mark in the exposed areas of the recording layer that remains crystalline in the unexposed areas. Erasure of written amorphous marks is realized by recrystallization through heating with the same laser at a lower power level, without melting the recording layer. The amorphous marks represent the data bits, which can be read, e.g. via the substrate, by a relatively low-power focused laser-light beam. Reflection differences of the amorphous marks with respect to the crystalline recording layer bring about a modulated laser-light beam which is subsequently converted by a detector into a modulated photocurrent in accordance with the recorded information.

One of the most important requirements in phase-change optical recording is a high data rate, which means that data can be written and rewritten in the medium with a user data rate of at least 30 Mbits/s. Such a high data rate requires the recording layer to have a high crystallization speed, i.e. a short crystallization time, during DOW. To ensure that previously recorded amorphous marks can be recrystallized during DOW, the recording layer must have a proper crystallization speed to match the velocity of the medium relative to the laser-light beam. If the crystallization speed is not high enough the amorphous marks from the previous recording, representing old data, cannot be completely erased, meaning recrystallized, during DOW. This causes a high noise level. A high crystallization speed is particularly required in high-density recording and high data rate optical recording media, such as in disk-shaped CD–RW high speed, DVD–RW, DVD+RW, DVD–RAM, DVR-red and blue which respectively are abbreviations of the known Compact Disk and the new generation high density Digital Versatile Disk+RW and –RAM, where RW and RAM refer to the rewritability of such disks, and Digital Video Recording optical storage disks, where red and blue refer to the used laser wavelength. For these disks, the complete erasure time (CET) has to be lower than 30 ns. CET is defined as the minimum duration of an erasing pulse for complete crystallization of a written amorphous mark in a crystalline environment. The CET is measured with a static tester. For DVD+RW, which has a 4.7 GB recording density per 120 mm disk, a user data-bit rate of 26 Mbits/s is needed, and for DVR-blue said rate is 35 Mbits/s. For high speed versions of DVD+RW and DVR-blue data rates of 50 Mbits/s and higher are required. The data rate for AV-applications is determined by the AV-information stream but for computer-data applications no restrictions in data rate apply, i.e. the larger the better. Each of these data bit rates can be translated to a maximum CET which is influenced by several parameters, e.g. thermal design of the recording stacks and the recording layer materials used.

Another important requirement is to increase the storage capacity of optical recording media like DVD-Rewritable and DVR (Digital Video Recorder) on a single-sided disk. This can be achieved by reducing the laser-light wavelength $\lambda$, and/or increasing the numerical aperture (NA) of a recording lens, because the laser-light spot size is proportional to $(\lambda/NA)^2$. Because of a smaller laser-light spot size, the marks, which are recorded, are smaller. Therefore the storage capacity of a disk increases because more marks fit per unit area of the disk. An alternative option is the application of multiple recording stacks. This is called dual- or double-stack recording, when two recording stacks on the same side of the optical disk are used, which are optically accessed from the same side with the same laser-light beam. When more than two recording stacks on the same side of the optical disk are used, it is called multi-stack recording.

For double or dual stack recording, the second recording stack, through which the laser-light beam enters first, must be sufficiently transmissive to ensure proper read/write characteristics of the first recording stack. Said known medium of U.S. Pat. No. 6,190,750 has a $|IP_2IM_2I^+|S|IP_1IM_1|$ structure for rewritable phase-change recording which has two metal reflective layers $M_1$ and $M_2$, which respectively are relatively thick, with a high optical reflection, and relatively thin, with a relatively high optical transmission. I represents a dielectric layer, $I^+$ represents a further dielectric layer. $P_1$ and $P_2$ represent phase-change recording layers, and S represents a transparent spacer layer. In this structure the laser-light beam enters first through the stack containing $P_2$. The metal layers not only serve as a reflective layer, but also as a heat sink to ensure rapid cooling for quenching the amorphous phase during writing. The $P_1$ layer is present proximate a relatively thick metal mirror layer $M_1$ which causes substantial cooling of the $P_1$ layer during recording while the $P_2$ layer is present proximate a relatively thin metal layer $M_2$ with limited heat sink properties. The cooling behavior of a recording layer determines to a large extent the correct formation of amorphous marks during recording. Sufficient heat sink action is required in order to ensure proper amorphous mark formation during recording.

In the known medium, the metal layer $M_2$ inevitably blocks a substantial part of the laser-light causing a reduced recording power at the $P_1$ layer. A further dielectric layer $I^+$ is used, in combination with the layer $M_2$, in order to increase the transmission of the $M_2$ layer. The metal layer $M_2$ is required for sufficient heat sink action. The thermal conductivity of this further dielectric layer alone still appears to be too low, and therefore its ability to rapidly reduce the temperature in the recording layer is insufficient. Because of the partial blocking of the laser-light a substantially higher write power for the $P_1$ recording layer is required. This means that a relatively large amount of laser-light power is needed in order to successfully write or rewrite data in the optical data storage medium, especially at high data rates which require a larger medium speed relatively to the laser-light beam. At larger write and rewrite speeds, more laser-light power is needed. In most cases, semiconductor lasers are used for generating the laser-light beam. Especially at shorter laser light wavelengths, e.g. lower than 700 nm, the maximum laser power of those lasers is limited and poses a barrier for high recording powers. Furthermore, large laser-light powers preferably are avoided because further recording stacks adjacent the first recording stack may be undesirably heated by the laser-light beam, which is focused onto the recording layer of the first recording stack. When no metal layer $M_2$ is used the cooling behavior of the layer $P_2$ is substantially different from the cooling behavior of the layer $P_1$. Because of this difference the way of writing at a given data rate in the layer $P_2$ substantially differs from the layer $P_1$. By way of writing, e.g., a pulse or write strategy is meant. It may even be impossible to successfully write in a layer with a relatively slow cooling behavior at a high enough data rate. In other words: the amorphous mark formation is highly counteracted because of the slow cooling rate of the P layer allowing substantial recrystallization.

It is an object of the invention to provide a multi-stack optical data storage medium of the kind described in the opening paragraph, which has at least one further recording stack that is substantially transparent to a laser-light beam in order to allow relatively low power writing in a subjacent recording stack and that has a sufficient heat sink action in order to ensure proper amorphous mark formation in the recording layer of said further recording stack.

This object is achieved in that at least one indium tin oxide (ITO) layer is present in at least one of the recording stacks.

The invention is based on the insight that the transmission of an IPIT stack almost solely is determined by the transmission of the P layer. T represents the ITO layer and I and P respectively represent a dielectric layer and a phase-change recording layer. A metal layer, which inevitably blocks a part of the laser-light, is absent. Due to the presence of the ITO layer sufficient heat sink action is present in the recording stack. ITO is a transparent material, which is normally used because of its relatively high electrical conductivity e.g. as a transparent electrode in liquid crystal displays (LCD's). Use of ITO as a material with high thermal conductivity in optical recording stacks is not known. As a result of the invention the laser-light power for writing in subjacent recording stacks is reduced considerably, e.g. by amounts up to about 50%.

In an embodiment of the optical data storage medium according to the invention the ITO layer is present in at least one of the further recording stacks at a side closest to the first recording stack adjacent a transparent spacer layer. Schematically the following structure may represent the embodiment: $|IP_nIT_n|S_n|IP_{n-1}IT_{n-1}|S_{n-1}| \ldots |IP_1I|$. The laser-light ente $IP_1I$ stack is the first recording stack, $S_n$ is a transparent spacer layer, $IP_nIT_n$ is the $n^{th}$ recording stack, and wherein I, P and T have the above mentioned meaning. It should be mentioned that many notations of the order of multi-stack design are possible. Sometimes multi-stack designs are represented by $L_n$ in which n denotes 0 or a positive integer number. The first stack through which the laser-light enters is called $L_0$, while each deeper stack is represented by $L_1 \ldots L_n$. Deeper is to be understood in terms of the direction of the incoming laser-light beam. In this document another notation is used in which the deepest stack has subscript number 1.

In another embodiment a further ITO layer is present in the further recording stack containing an ITO layer, the further ITO layer being present at a side of the further recording stack opposite from the side of the ITO layer. Schematically this may be represented by the following structure:

$$|T_nIP_nIT_n|S_n|T_{n-1}IP_{n-1}IT_{n-1}|S_{n-1}| \ldots |IP_1I|.$$

In such way, a symmetrical stack may be formed with a heat sink layer on both sides of the recording layer. This has the advantage that the cooling behavior is more symmetrically distributed, which results in a more optimal writing and erasing of amorphous marks in the recording layer.

In a favorable embodiment a further ITO layer is present in the first recording stack at a side closest to the further recording stack and a metal reflective layer is present in the recording stack at a side most remote from the further recording stack. Because the first recording stack is the last stack at which the laser-light arrives a non-transparent metal reflective layer may be present in order to enhance the total reflection of the optical data storage medium. Furthermore, the metal layer will act as an excellent heat sink for the first recording stack.

In a refinement of the previous embodiment, the metal reflective layer is replaced by an ITO layer. When the P layer has sufficient reflectivity of itself, the metal layer may be replaced by an ITO layer. The advantage is that the cooling behavior of the first recording stack is substantially equal to the cooling behavior of a further recording stack in which ITO layers may be present in the same configuration. In this way, the write and erase properties of the first and farther recording stacks are substantially equal. Furthermore, from an economic viewpoint, the deletion of a metal layer is advantageous. For the metal reflective layer of the first recording stack, metals such as Al, Ti, Au, Ni, Cu, Ag, Rh, Pt, Pd, Ni, Co, Mn and Cr, and alloys of these metals, can be used. Examples of suitable alloys are AlTi, AlCr and AlTa. Ag is preferred because of its high thermal conductivity. The thickness of this metal reflective layer is not critical, but preferably the transmission is zero for obtaining maximal reflection. For practical reasons the thickness is about 100 nm.

Preferably, the ITO layer has a thickness in the range of 5 to 200 nm. A too thin layer does not exhibit sufficient heat sink action while a too thick layer may deteriorate the optical transmission of the recording stacks. Furthermore, a thick layer is more expensive to deposit.

In advantageous embodiments the recording layer is in contact with at least one additional layer comprising a compound selected from the group consisting of $Al_2O_3$, SiC, $Si_3N_4$, MgO, ZnO and AlN including their non-stoichiometric compositions, said additional layer having a maximum thickness of 10 nm. These layers increase the crystallization speed of the amorphous marks during DOW, directly resulting in a higher possible data rate. The interface between these layers and the recording layer acts as a nucleation source for crystallization of the amorphous marks. The additional layer has a relatively small thickness. Therefore, the additional layer only has a relatively small influence on the transfer capability of heat in the recording layers to the ITO layers. In other words, the ITO heat sink action is hardly changed by the additional layer.

The recording layers preferably comprise the elements Ge and Te. The recording layers are of the phase-change type. A phase-change material shows a crystalline-amorphous phase transition. Further useful are compounds of In—Sb—Te, Te—Se—Sb, Ag—In—Sb—Te, Ge—Sb—Te, Ge—In—Sb—Te or Ge—Te. Especially useful are the compounds described in the international patent applications WO 01/13370 and WO 97/50084, both filed by Applicants. The compounds in WO 97/50084 have a composition defined in atomic percentages by the formula:

$Ge_{50x}Sb_{40-40x}Te_{60-10x}$, wherein $0.166 \leq x \leq 0.444$. These compositions are situated on the line connecting the compounds GeTe and $Sb_2Te_3$ in the triangular Ge—Sb—Te composition diagram, and include the stoichiometric compounds $Ge_2Sb_2Te_5$ (x=0.444), $GeSb_2Te_4$ (x=0.286) and $GeSb_4Te_7$ (x=0.166). These compounds show a short crystallization (erasure) time.

The compounds in WO 01/13370 have a composition defined in atomic percentages by the formula:

$Q_a In_b Sb_c Te_d$ (in atomic percentages), wherein

Q is selected from the group consisting of Ag and Ge, $2 < a < 8$ $0 < b < 6$ $55 < c < 80$ $15 < d < 30$ and $a+b+c+d=100$.

Preferably, the recording layer of a further recording stack has a thickness between 5 and 25 nm. A thicker layer would result in a too low transmission. The recording layer of the first recording stack may be thicker, e.g. between 5 and 50 nm.

In all recording stacks, a dielectric layer at a side of the phase-change recording layer remote from the substrate protects the recording layer from the influence of the generally organic spacer layer and optimizes the optical contrast. In view of this optical contrast, the thickness of this layer is preferably limited to $(70+\lambda/2n)$ nm, wherein $\lambda$ is the wavelength of the laser-light beam, and n is the refractive index of the dielectric layer In the first recording stack, the dielectric layer between the recording layer and the preferred metal reflective layer is between 10 and 50 nm, preferably between 20 and 40 nm. When this layer is too thin, the thermal insulation between the recording layer and the metal reflective layer is adversely affected. Therefore, the cooling rate of the recording layer is increased, which leads to a poor crystallization process and possibly a poor cyclability. The cooling rate will be decreased by increasing the thickness of the dielectric layer. A relatively thick dielectric layer is preferred in order to increase the sensitivity of the recording layer of the first recording stack.

The dielectric layers I are preferably made of a mixture of ZnS and $SiO_2$, e.g. $(ZnS)_{80}(SiO_2)_{20}$. The layers may also be made of $SiO_2$, $Ta_2O_5$, $TiO2$, ZnS, including their non-stoichiometric compositions.

The transparent spacer layers between the first and further recording stacks have a thickness larger than the depth of focus of the laser-light beam, e.g. 10 μm. This thickness ensures that the first and second recording stacks are optically decoupled, i.e. a laser-light beam focused on the recording layer of the first recording stack does not read/write information from/onto further recording stacks, and vice versa. In this way, the storage capacity is increased with respect to a single-layered data storage medium. The material of the spacer layer is e.g. a UV-cured acrylate adhesive, in which servotracks may be provided by a replication process.

The substrate of the data storage medium is at least transparent for the laser wavelength, and is made, for example, of polycarbonate, polymethyl methacrylate (PMMA), amorphous polyolefin or glass. Transparency of the substrate is only required when the laser-light beam enters the recording stacks via the entrance face of the substrate. In a typical example, the substrate is disk-shaped and has a diameter of 120 mm and a thickness of 0.6 or 1.2 mm. The substrate may be opaque when the laser-light beam enters the stack via the side opposite from the side of the substrate.

The surface of the disk-shaped substrate on the side of the recording stacks is, preferably, provided with a servotrack, which can be scanned optically. This servotrack is often constituted by a spiral-shaped groove and is formed in the substrate by means of a mould during injection molding or pressing. These grooves can be alternatively formed in a replication process in the synthetic resin of the spacer layer, for example, a UV light-curable acrylate Optionally, the outermost layer of the stack is screened from the environment by means of a protective layer of, for example, UV light-cured poly(meth)acrylate. The protective layer must be of good optical quality, i.e. substantially free from optical aberrations and substantially uniform in thickness, when the laser-light enters the recording stacks via the protective layer. In this case, the protective layer is transparent to the laser-light.

Recording and erasing data in the recording layers of the recording stacks may be achieved by using a short-wavelength laser, e.g. with a wavelength of 660 nm or shorter (red to blue).

Both the metal reflective layer, and the dielectric layers can be provided by evaporation or sputtering.

The ITO layers can be provided by sputtering or by wet chemical means.

The phase-change recording layer can be applied to the substrate by vacuum deposition. Known vacuum deposition processes are evaporation (E-beam evaporation, resistant heat evaporation from a crucible), sputtering, low pressure Chemical Vapor Deposition (CVD), Ion Plating, Ion Beam Assisted Evaporation, Plasma enhanced CVD. Normal thermal CVD processes are not applicable because of too high reaction temperature.

The invention will be elucidated in greater detail by means of exemplary embodiments and with reference to the accompanying drawings, in which FIGS. 1 to 3 each show a schematic cross-sectional view of an embodiment of a multi-stack optical data storage medium in accordance with the invention.

Figure 1:
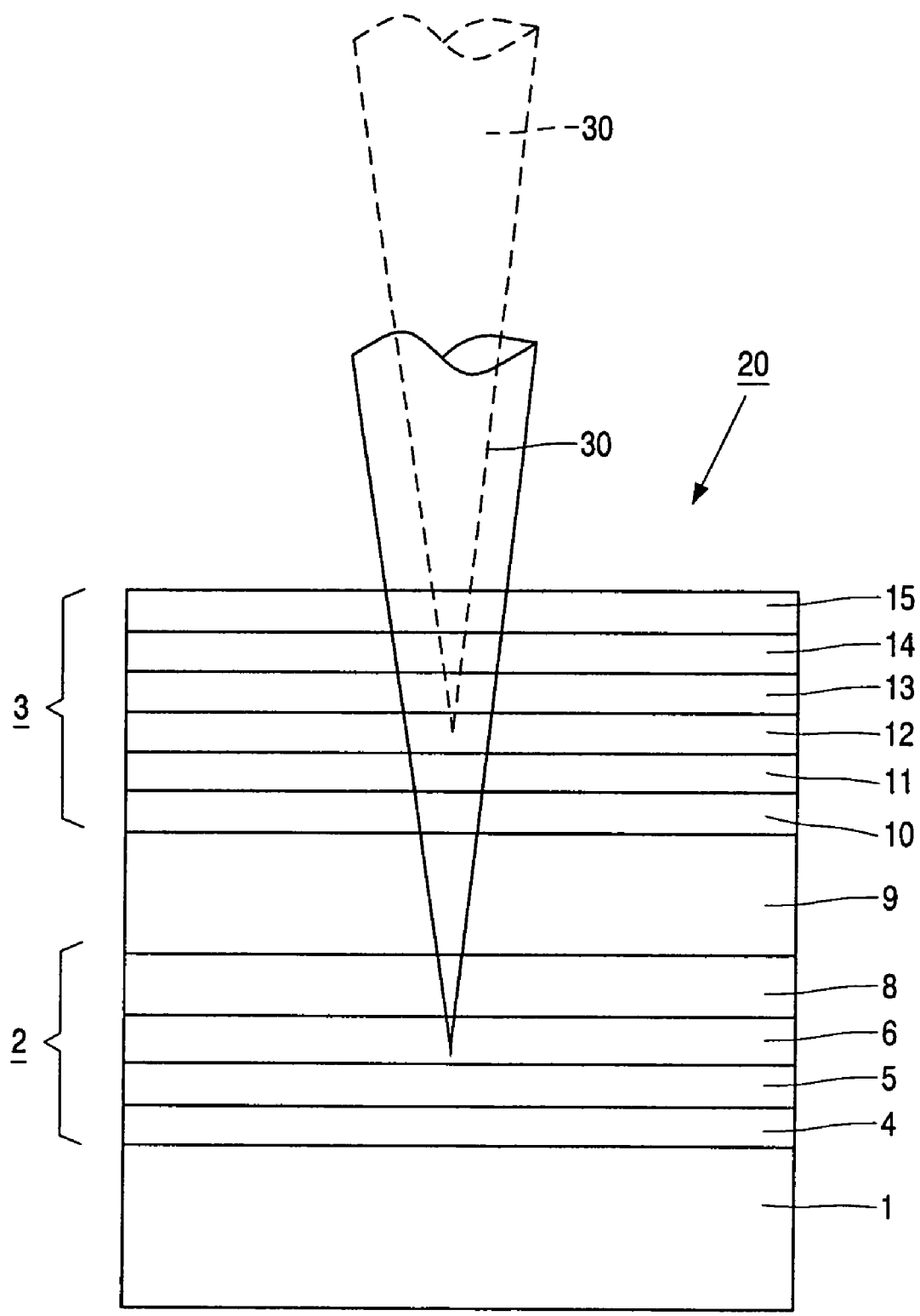

In FIG. 1, an embodiment of the multi-stack optical data storage medium 20 for rewritable recording by means of a focused laser-light beam 30 is shown. The medium has a substrate 1, made of polycarbonate (PC), with deposited on a side thereof:
- a first recording stack 2 comprising a phase-change type recording layer 6. The first recording stack 2 is most remote for the focused laser-light beam 30.
- a second recording stack 3 comprising a phase-change type recording layer 12.
- a transparent spacer layer 9 adjacent the second recording stack 3 at a side closest to the first recording stack 2. The transparent layer spacer layer 9 has a thickness of 30 µm, which is larger than the depth of focus of the focused laser-light beam 30. The recording layer 6 of the first recording stack comprises the compound with atomic composition $Ge_{5.0}In_{5.5}Sb_{65.0}Te_{24.5}$ and has a thickness of 10 nm. A metal reflective layer 4 is present in the first recording stack 2 at a side most remote from the second recording stack 3. The metal reflective layer 4 comprises the metal Ag and has a thickness of 100 nm. A dielectric layer 5, having a thickness of 25 nm, is present between the recording layer 6 and the metal reflective layer 4. The dielectric layer 5 comprises the compound $(ZnS)_{80}(SiO2)_{20}$. An indium tin oxide (ITO) layer 8, having a thickness of 130 nm, is present in the first recording stack at a side closest to the second recording stack 3.

The recording layer 12 of the second recording stack 3 comprises the compound with atomic composition $Ge_{5.0}In_{5.5}Sb_{65.0}Te_{24.5}$ and has a thickness of 6 nm. An indium tin oxide (ITO) layer 10, having a thickness of 80 nm, is present in the second recording stack 3 at a side closest to the first recording stack 2 adjacent the transparent spacer layer 9. A further ITO layer 14, having a thickness of 100 nm, is present in the second recording stack 3 at a side of the second recording stack 3 opposite from the side of the ITO layer 10. Two dielectric layers 11 and 13, both having a thickness of 20 nm and made of $(ZnS)_{80}(SiO2)_{20}$, are present in contact with the recording layer 12 of the second recording stack 3. A protective layer 15, made e.g. of a laser-light transparent UV curable resin having a thickness of 100 µm is present adjacent the further ITO layer 14. Spincoating and subsequent UV curing may provide layer 15. The protective layer 15 may also be provided by applying, e.g., a sheet of polycarbonate (PC) by means of a Pressure Sensitive Adhesive (PSA) layer. The optical reflection of the first recording stack 2, at a wavelength of 670 nm and when the recording layer 6 is in amorphous phase, is defined as $R_a$ and has a value of 1.4%. The optical reflection of the recording stack 2, at a wavelength of 670 nm and when the recording layer 6 is in the crystalline phase, is defined as $R_c$ and has a value of 28.7%. The optical contrast is 95.2%. The optical contrast is defined as $|R_c-R_a|/R_{max}$ in which formula $R_{max}$ is the maximum value of either $R_c$ and $R_a$. For the second recording stack 3 these values are $R_a$=3.1%, $R_c$=14.4% and an optical contrast of 78.6%. The transmission of the second recording stack 3 at a wavelength of 670 nm is 52.2% ($T_a$) when the recording layer is in the amorphous phase and 39.0% ($T_c$) when the recording layer is in the crystalline phase.

Figure 2:
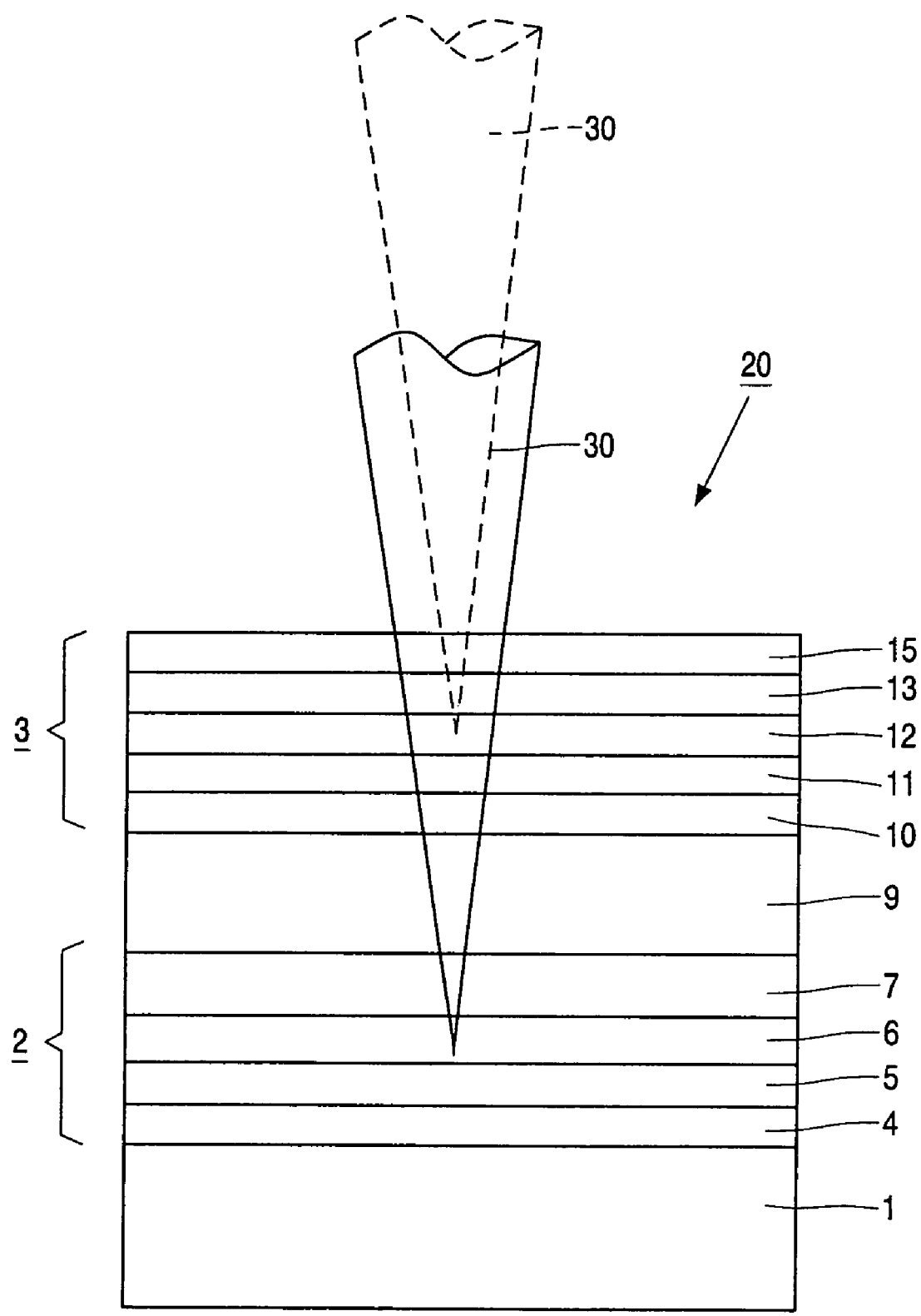

In FIG. 2, another embodiment of the multi-stack optical data storage medium 20 for rewritable recording by means of a focused laser-light beam 30 is shown. The recording layer 6 of the first recording stack 2 comprises the compound with atomic composition $Ge_{5.0}In_{5.5}Sb_{65.0}Te_{24.5}$ and has a thickness of 10 nm. A metal reflective layer 4 is present in the first recording stack 2 at a side most remote from the second recording stack 3. The metal reflective layer 4 comprises the metal Ag and has a thickness of 100 nm. A dielectric layer 5 having a thickness of 25 nm is present between the recording layer and the metal reflective layer. A further dielectric layer 7, having a thickness of 130 nm, is present in the first recording stack 2 at a side closest to the second recording stack 3. Both dielectric layers comprise the compound $(ZnS)_{80}(SiO2)_{20}$.

The recording layer 12 of the second recording stack 3 comprises the compound with atomic composition $Ge_{5.0}In_{5.5}Sb_{65.0}Te_{24.5}$ and has a thickness of 6 nm. An indium tin oxide (ITO) layer 10, having a thickness of 100 nm, is present in the second recording stack at a side closest to the first recording stack adjacent the transparent spacer layer. A dielectric layer 11, having a thickness of 20 nm and made of $(ZnS)_{80}(SiO2)_{20}$, is present between the ITO layer 10 and the recording layer 12 of the second recording stack 3. A further dielectric layer 13 is present at the other side of the recording layer 12 of the second recording stack 3. The protective layer 15 and the substrate 1 are the same as described in the description of FIG. 1. The optical reflection of the first recording stack 2, at a wavelength of 670 nm and when the recording layer 6 is in amorphous phase, is defined as $R_a$ and has a value of 2.0%. The optical reflection of the recording stack 2, at a wavelength of 670 nm and when the recording layer 6 is in the crystalline phase, is defined as $R_c$ and has a value of 30.8%. The optical contrast is 93.5%. The optical contrast is defined above. For the second recording stack 3 the values are $R_a$=4.8%, $R_c$=16.9% and an optical contrast of 72.0%. The transmission of the second recording stack 3 at a wavelength of 670 nm is 51.0% ($T_a$) when the recording layer 12 is in the amorphous phase and 37.5% ($T_c$) when the recording layer 12 is in the crystalline phase.

Figure 3:
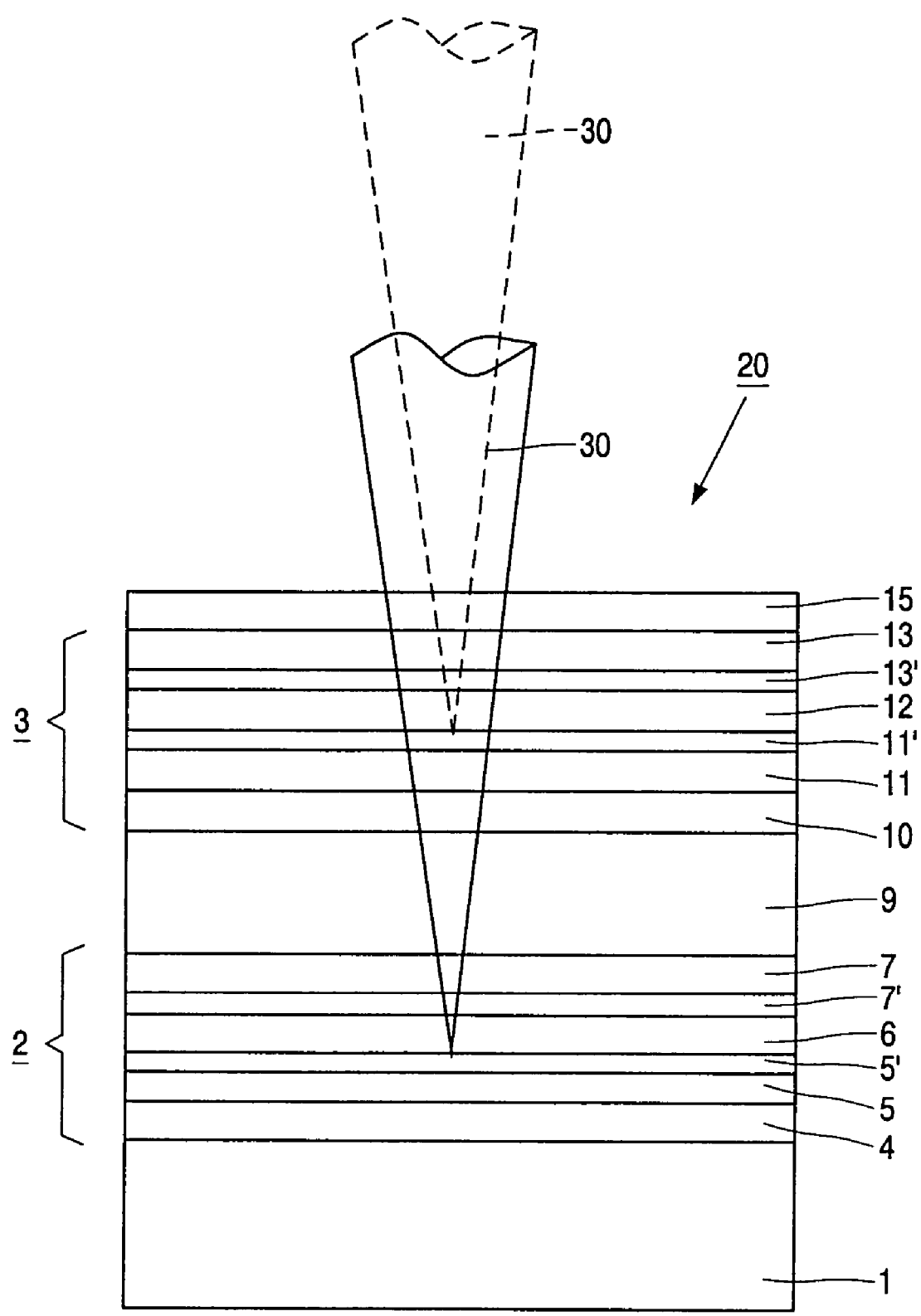

In FIG. 3, another embodiment of the multi-stack optical data storage medium 20 for rewritable recording by means of a focused laser-light beam 30 is shown. Both recording layers 6 and 12 are in contact with four additional layers 5', 7', 11' and 13' made of SiC. The additional SiC layers 5', 7', 11' and 13' all have a thickness of 5 nm. Further layers in FIG. 3 are identical to the corresponding layers in the embodiment in FIG. 2, with the exception that the thickness of each of the dielectric layers 5, 7, 11 and 13 is reduced by 5 nm. This results in a multi-stack optical data storage medium 20 with the same optical reflectivity and transmission as described with FIG. 2. The presence of the SiC layers 5', 7', 11' and 13' in contact with the recording layers 6 and 12 increases the crystallization speed of the recording layers 6 and 12.

Figure 4:
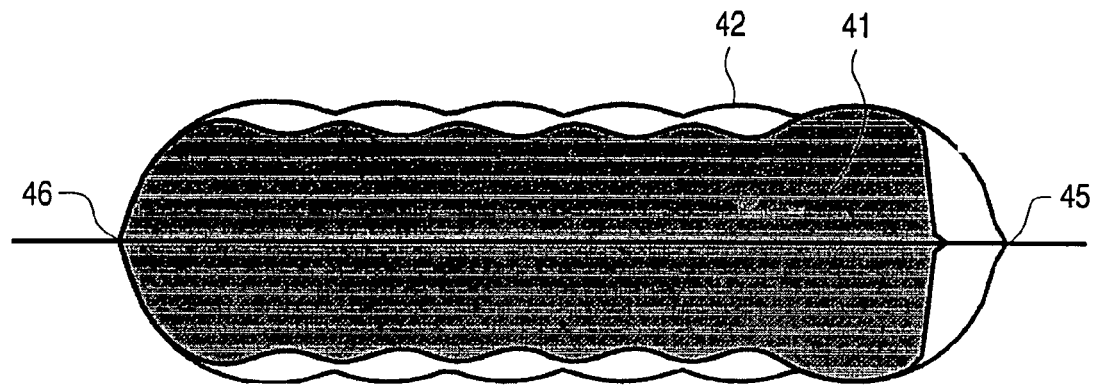
FIG. 4 shows a planar view of the calculated size of an amorphous mark written with a conventional write strategy at DVR-blue conditions for an IPIM stack.

In FIG. 4 the result of an amorphous mark 41 formation simulation is shown for an IPIM stack with the respective thicknesses of 130-10-15-120 nm. The I layers are made of conventional $(ZnS)_{80}(SiO2)_{20}$. The P layer is a doped eutectic SbTe composition with a high crystal growth velocity, a so-called fast growth material (FGM). M is a metal layer of Ag. In the simulation the amorphous mark 41 is written using a write strategy with laser-light pulse train of 6 write pulses with a power of 6 mW at a linear velocity of the medium of 8.1 m/s. A background erase power level of 2.5 mW for DOW is maintained before and after the pulse train. The laser-light wavelength is 405 nm, focused with a numerical aperture (NA) of 0.85, which are the DVR-blue conditions. The solid black line 42 indicates the maximum melt-edge while the filled area 41 denotes the final amorphous mark after cooling down. The resulting amorphous mark 41 is nearly as broad as the maximum melt-edge 42. The suppressed heat accumulation due to the presence of the good heat sink M minimizes re-crystallization at the leading edge 46 of the mark. The erase power, applied after the pulse train with write pulses, causes a noticeable re-crystallization during mark formation at the trailing edge 45 of the mark. This however can be compensated for with an appropriate write strategy.

Figure 5:
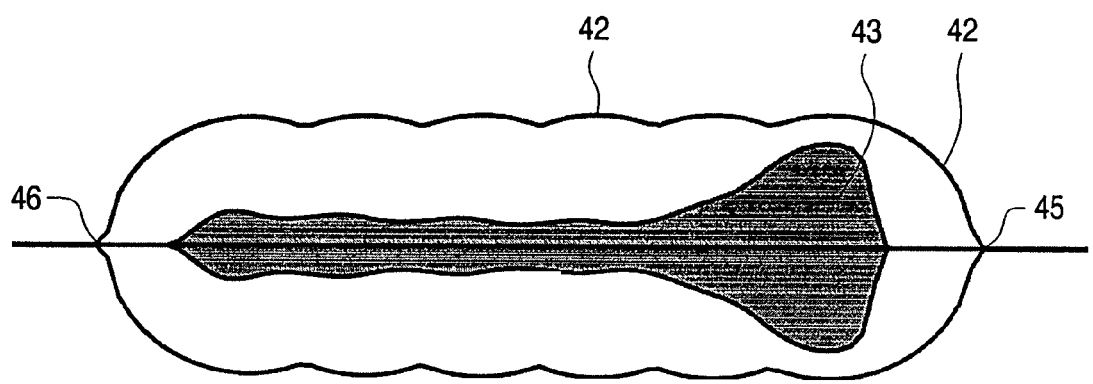
FIG. 5 shows a planar view of the calculated size of an amorphous mark written with a conventional write strategy at DVR-blue conditions for an IPI stack.

In FIG. 5 the result of an amorphous mark 43 formation simulation is shown for an IPI stack with the respective thicknesses of 120-8-80 nm. The write power is 5 mW and the erase power is 1.5 mW. Further, the conditions are the same as described in the description of FIG. 4. Is should be noted that severe re-crystallization during amorphous mark 43 formation is observed due to the absence of a proper heat sink for rapid cool down of the recording layer. It is obvious that the distorted shape of the amorphous mark 43 of FIG. 5 leads to severe distortion of the signal during read-out of the amorphous mark 43.

Figure 6:
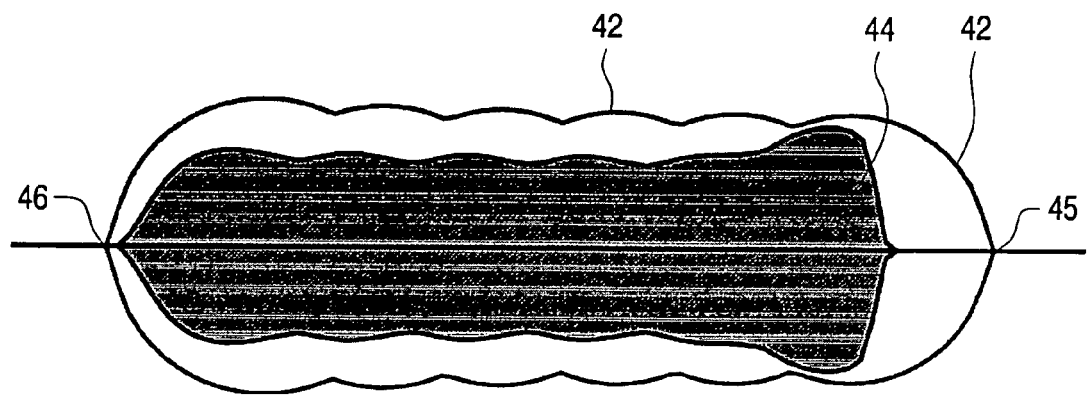
FIG. 6 shows a planar view of the calculated size of an amorphous mark written with a conventional write strategy at DVR-blue conditions for a TIPIT stack.

In FIG. 6 the result of an amorphous mark 44 formation simulation is shown for a TIPIT stack with the respective thicknesses of 115-5-8-5-75 nm. Further, the conditions are the same as described in the description of FIG. 4 with the exception that the laser-light write power is 11 mW and that the erase power level is 5.2 mW. T is transparent heat sink with a thermal conductivity of 10 W/mK. An important consequence of the heat sinks T is the significant reduction in sensitivity of the stack with respect to write power. Is should be noted that severe re-crystallization during amorphous mark 44 formation is counteracted due to the presence of a the heat sinks T. The shape of the amorphous mark 44 is nearly as big as in the amorphous mark 41 of FIG. 4. The small deviation in size can be compensated for by using an appropriate write strategy during recording. It further should be noted that the thermal conductivity of thin layers may substantially differ from the bulk thermal conductivity of the material of which the thin layer is made. This is due to the structure, which is influenced by the deposition conditions, of the thin layer.

It should be noted that the above-mentioned embodiments and simulations illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention, a multi-stack optical data storage medium for rewritable recording by means of a focused laser-light beam is provided. The medium has at least two recording stacks comprising a phase-change type recording layer. The recording stacks other than the recording stack which meets the laser-light beam last have a high transparency for the laser-light beam combined with a good cooling behavior of the recording layer in said stack. This is achieved in that at least one ITO layer is present near the recording layer of the highly transparent recording stacks.

The invention claimed is:

1. A multi-stack optical data storage medium for rewritable recording by means of a focused laser-light beam, said medium having a substrate with deposited on a side thereof:
a first recording stack comprising a phase-change type recording layer, said first recording stack being present most remote for the focused laser-light beam,
at least one further recording stack comprising a phase-change type recording layer,
a transparent spacer layer adjacent each further recording stack at a side closest to the first recording stack, said transparent spacer layer having a thickness larger than the depth of focus of the focused laser-light beam,
wherein at least one indium tin oxide layer is present between the phase-change type recording layer of the first recording stack and the phase-change type recording layer of the at least one further recording stack closest to the first recording stack, and
wherein an additional indium tin oxide layer is used in place of a reflective layer and is present in the first recording stack at a side most remote from the least one further recording stack.

2. The optical data storage medium as claimed in claim 1, wherein the indium tin oxide layer is present in at least one of the further recording stacks at a side closest to the first recording stack adjacent a transparent spacer layer.

3. The optical data storage medium as claimed in claim 1, wherein a further indium tin oxide layer is present in the further recording stack containing the indium tin oxide layer, the further indium tin oxide layer being present at a side of the further recording stack opposite from the side of the indium tin oxide layer.

4. The optical data storage medium as claimed in claim 1, wherein the indium tin oxide layer has a thickness in the range of 5 to 200 nm.

5. The optical data storage medium as claimed in claim 1, wherein the recording layer is in contact with at least one additional layer comprising a compound selected from the group consisting of $Al_2O_3$, $SiC$, $Si_3N_4$, $MgO$, $ZnO$ and $AlN$ including their non-stoichiometric compositions, said additional layer having a maximum thickness of 10 nm.

6. The optical data storage medium as claimed in claim 1, wherein the recording layers comprise the elements Ge and Te.

7. The optical data storage medium according to claim 1, wherein the optical data storage medium is configured for multi-stack and high data rate recording.

8. An optical data storage medium for rewritable recording by means of a focused laser-light beam, said medium having a substrate with deposited on a side thereof:
a first recording stack comprising a phase-change type recording layer, said first recording stack being present most remote for the focused laser-light beam,
at least one further recording stack comprising a phase-change type recording layer,
a transparent spacer layer adjacent each further recording stack at a side closest to the first recording stack, said transparent spacer layer having a thickness larger than the depth of focus of the focused laser-light beam,
wherein at least one indium tin oxide layer is present between the phase-change type recording layer of the first recording stack and the phase-change type recording layer of the at least one further recording stack closest to the first recording stack,
wherein a further indium tin oxide layer is present in the first recording stack at a side closest to the further recording stack wherein a further layer is present in the first recording stack at a side most remote from the further recording stack, and wherein the further layer is an indium tin oxide layer used in place of a reflective layer.

9. A multi-stack optical data storage medium for rewritable recording by means of a focused laser-light beam, said medium having a substrate with deposited on a side thereof:
- a first recording stack comprising a phase-change type recording layer,
- at least one further recording stack comprising a phase-change type recording layer,
- a transparent spacer layer adjacent the further recording stack at a side closest to the first recording stack,
- wherein at least one indium tin oxide layer is present between the phase-change type recording layer of the first recording stack and the phase-change type recording layer of the at least one further recording stack closest to the first recording stack, and
- wherein an additional indium tin oxide layer is used in place of a metal reflective layer and is present in the first recording stack at a side most remote from the least one further recording stack, wherein a further indium tin oxide layer is present in the first recording stack at a side closest to the further recording stack.

10. The optical data storage medium as claimed in claim 9, wherein at least one additional indium tin oxide layer is present in one of the recording stacks.

11. The optical data storage medium as claimed in claim 9, wherein a further indium tin oxide layer is present in the further recording stack, the further indium tin oxide layer being present at a side of the further recording stack opposite from the side of the indium tin oxide layer.

12. The optical data storage medium as claimed in claim 9, wherein the indium tin oxide layer has a thickness in the range of 5 to 200 nm.

13. The optical data storage medium as claimed in claim 9, wherein the recording layer is in contact with at least one additional layer comprising a compound selected from the group of $Al_2O_3$, SIC, $Si_3N_4$, MgO, ZnO and AlN including their non-stoichiometric compositions, said additional layer having a maximum thickness of 10 nm.

14. The optical data storage medium as claimed in claim 9, wherein the recording layers comprise the elements Ge and Te.

15. The optical data storage medium according to claim 9, wherein the optical data storage medium is configured for multi-stack and high data rate recording.

16. The optical data storage medium as claimed in claim 9, wherein the said first recording stack being present most remote from the focused laser-light beam.

17. An optical data storage medium for rewritable recording by means of a focused laser-light beam, said medium having a substrate with deposited on a side thereof:
- a first recording stack comprising a phase-change type recording layer,
- at least one further recording stack comprising a phase-change type recording layer,
- a transparent spacer layer adjacent the further recording stack at a side closest to the first recording stack,
- wherein at least one indium tin oxide layer is present between the phase-change type recording layer of the first recording stack and the phase-change type recording layer of the at least one further recording stack closest to the first recording stack, and
- wherein an additional indium tin oxide layer is used in place of a metal reflective layer and is present in the first recording stack at a side most remote from the least one further recording stack, wherein said transparent spacer layer has a thickness larger than the depth of focus of the focused laser-light beam.

* * * * *